June 24, 1924.

J. H. CHANDLER 1,499,152

RESILIENT DEVICE FOR VEHICLES

Filed July 6, 1922

3 Sheets-Sheet 3

Inventor:
James Henry Chandler.
Attorney:

Patented June 24, 1924.

1,499,152

UNITED STATES PATENT OFFICE.

JAMES HENRY CHANDLER, OF LONDON, ENGLAND.

RESILIENT DEVICE FOR VEHICLES.

Application filed July 6, 1922. Serial No. 573,158.

*To all whom it may concern:*

Be it known that I, JAMES HENRY CHANDLER, residing at London, England, a subject of the King of Great Britain and Ireland, have invented an Improved Resilient Device for Vehicles, of which the following is a specification.

This invention relates to a draft gear mechanism for road vehicles adapted also for use as buffer mechanism.

The invention involves the use of elements operating under known principle and including a coiled spring located between two elements slidable in fixed supports, and a rod or traction member slidable through said elements; the parts being so constructed and arranged that whatever the direction of traction or shock on said member, the spring is always subject to compression.

The invention consists in a duplex draft gear and buffer device, one part or unit of which is located at each side of the road vehicle. Each such unit comprises spaced bearings each containing a sleeve or hollow shaft adapted to slide therein and fitted with an abutment in the form of a collar or nut which engages against an end of the adjacent bearing. A coiled spring is compressed between said abutments, and other abutments or collars on the outer ends of said sleeves are also used. A rod extends through and is slidable within said sleeves, and stops are mounted at each end of said rod, against which the abutments on the sleeves are forced by the spring.

The two units or devices referred to so coöperate that in a hauled vehicle the tracking or steering thereof is much improved inasmuch as when one bar or device is being pulled outwards the other is being forced inwards. Yet at all times, the springs are under compression, and substantially no rebounding effect is produced, thus steadying the vehicle in its course. The springs act at the same time as buffers similarly to those used on railway vehicles.

In other words, the invention assists a hauled vehicle to follow the track of the hauling implement, as when turning a sharp corner, by elongation of the device and associated parts on the outside of the curve and the contraction of the device on the inside. Automatic compensation is thereby provided for the angular displacement which takes place between the two vehicles, the hauled vehicle being thus elastically guided around the curve without transverse strain.

When using a device of the construction described with a trailed vehicle, the hauling implement is permitted to travel down gradients at an accelerated speed without danger of the trailed vehicle swinging out or "sheering", which might otherwise occur when said hauling implement strikes road impediments or is suddenly stopped.

Figure 1:
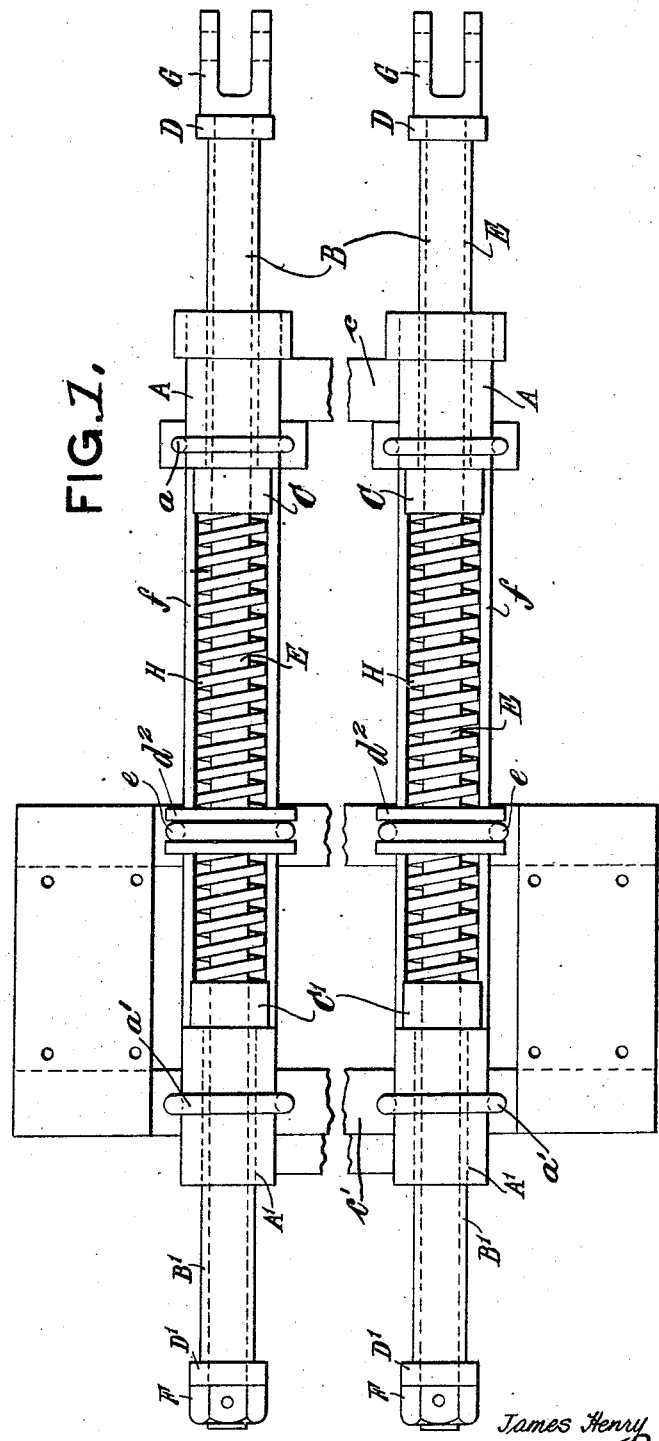
Figure 2:
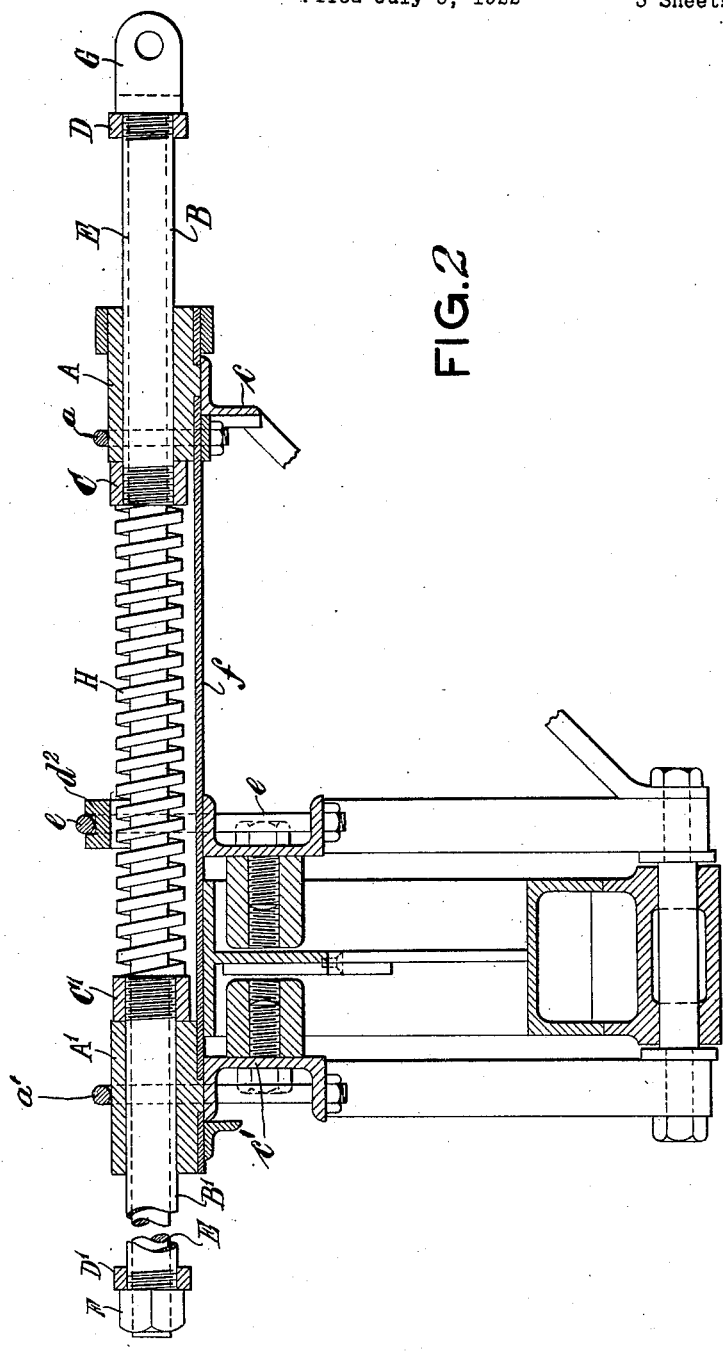
Figure 3:
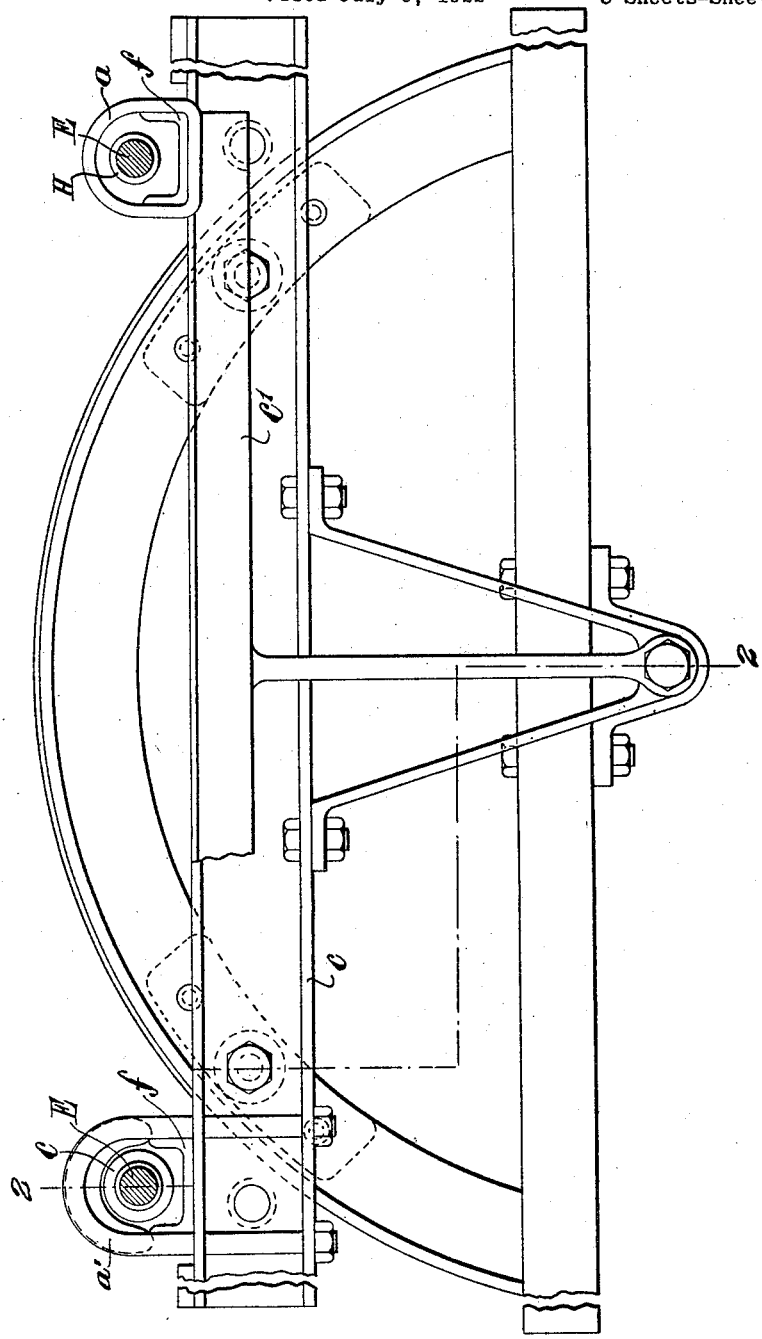

An embodiment of the invention is illustrated in the accompanying drawings in which Fig. 1 is a plan view, Fig. 2 is a section on line 2—2 of Fig. 3, and Fig. 3 a sectional front elevation.

To refer more particularly to the drawings, the device at each side of the vehicle comprises two bearings A and $A^1$ which are stationary and shown as secured as by shackles $a$ $a^1$ respectively to two cross-beams $c$ and $c^1$ of a vehicle framing. Extending through each of said bearings is a hollow sleeve or tubular member B $B^1$ which slides in its respective bearing and is provided at its inner end between the bearings with a collar or abutment C $C^1$ which may be in the form of a nut. Other collars, abutments or stop nuts D $D^1$ are provided on the outer ends of the sleeves B $B^1$.

Within each sleeve slides a rod E and coiled about that part of the rod which lies between the bearings A $A^1$ is a strong helical spring H which bears at its opposite ends against the abutments C $C^1$ of the sleeves B $B^1$. The rod is also provided at one end with a nut F which bears against the abutment $D^1$ of the sleeve $B^1$ and at the opposite end with a head G which bears against the abutment D of sleeve B and may form the forward pulling end of the device.

With such a construction when the pull or shock is in a forward or right-hand direction, the nut F on rod E bears against the collar $D^1$ of the sleeve $B^1$, which latter slides in the bearings $A^1$, and the collar $C^1$ at the opposite end of said sleeve acts on the spring H to compress same; on the other hand, when the strain or shock is in the reverse direction, the head G on rod E bears against the collar D of sleeve B, which latter slides in the bearing A, and the collar C at the opposite end of this sleeve B acts on the spring H to compress it. Whatever the direction of shock or pull, the spring is always under compression and by the location of the spring between the two sleeve collars C, $C^1$ rebound action of the spring on release of the strain or shock is reduced to a minimum. The head G may be replaced by another nut as F or other suitable element according to the use of the device.

Other guiding bearings $d^2$ (Fig. 2) are shown between bearings A A¹ secured by shackles $e$, and the bearings A A¹ are shown as connected by channel bars $f$ to secure rigidity. The construction of the forecarriage to which this duplex device is shown applied, forms no part of the present invention.

What I claim as my invention and desire to secure by Letters Patent of the United States is:—

1. A draft gear and buffer mechanism for road vehicles, comprising a pair of spaced, alining bearings, a sleeve slidable in each bearing and fitted with an abutment which engages against an end of the adjacent bearing, a coiled spring compressed between said abutments, other abutments on the outer ends of said sleeves, a rod extending through and slidable within said sleeves, and stops at each end of said rod against which the outer end abutments on the sleeves are forced by the spring.

2. A draft gear and buffer mechanism for road vehicles, comprising a pair of spaced, alining bearings; means for securing them to the frame beams of a vehicle; a sleeve individual to each bearing and slidably fitting therein, each sleeve projecting at opposite ends beyond the corresponding bearing and provided at said ends with collars; a rod projecting through and beyond both sleeves; an expansible coil spring encircling said rod and interposed between the collars on the inner ends of the sleeves to normally force the latter away from each other until said collars abut against the inner ends of the bearings; and a channel bar connecting said bearings.

In witness whereof I have signed this specification.

JAMES HENRY CHANDLER.